US006788013B2

(12) United States Patent
Islam et al.

(10) Patent No.: US 6,788,013 B2
(45) Date of Patent: Sep. 7, 2004

(54) PERMANENT MAGNET ELECTRIC MOTOR AND METHOD OF MAKING SAME

(75) Inventors: Mohammad S. Islam, Saginaw, MI (US); Tomy Sebastian, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/361,971

(22) Filed: Feb. 10, 2003

(65) Prior Publication Data

US 2004/0155547 A1 Aug. 12, 2004

(51) Int. Cl.[7] .................................................. H02P 7/00
(52) U.S. Cl. ....................... 318/432; 318/605; 318/661; 310/156.05; 310/156.74; 310/168
(58) Field of Search ................................. 318/432, 605, 318/661; 310/156.05, 156.74, 168

(56) References Cited

U.S. PATENT DOCUMENTS

| | | | |
|---|---|---|---|
| 4,672,253 A | * 6/1987 | Tajima et al. | ................ 310/269 |
| 4,692,645 A | * 9/1987 | Gotou | ......................... 310/184 |
| 4,739,201 A | * 4/1988 | Brigham et al. | ........... 310/49 R |
| 5,763,976 A | * 6/1998 | Huard | ......................... 310/168 |
| 5,801,463 A | * 9/1998 | Suzuki et al. | ................... 310/51 |
| 5,811,904 A | * 9/1998 | Tajima et al. | ........... 310/156.45 |
| 5,936,322 A | * 8/1999 | Yamaguchi et al. | ... 310/156.19 |
| 6,034,459 A | 3/2000 | Matsunobu et al. | ......... 310/156 |
| 6,380,658 B1 | 4/2002 | Sebastian et al. | ............ 310/261 |
| 6,429,565 B1 | 8/2002 | Matsunobu et al. | ... 310/156.38 |

OTHER PUBLICATIONS

U.S. 2002/0153795 A1, Pub. Date Oct. 24, 2002, Matsunobu et al., U.S. Cl. 310/156.38, filed Jun. 12, 2002.
U.S. 2002/0167242 A1, Pub. Date Nov. 14, 2002, Liu et al., U.S. Cl. 310/184, filed May 8, 2001.
U.S. 2002/0101126 A1, Pub. Date Aug. 1, 2002, Crapo et al., U.S. Cl. 310/156.01, filed Jan. 30, 2001.

* cited by examiner

*Primary Examiner*—Rina Duda
(74) *Attorney, Agent, or Firm*—Michael D. Smith

(57) ABSTRACT

A motor for reducing torque ripple includes a shaft having a shaft axis, a rotor positioned about the shaft, a first magnet ring positioned on the rotor, the first magnet ring having magnets each occupying a magnet angle $\delta$ on the rotor, and a second magnet ring positioned on the rotor, the second magnet ring having magnets each occupying a magnet angle $\delta$ on the rotor, wherein the second magnet ring is shifted a non-zero number of degrees relative to the first magnet ring and wherein ends of each magnet within the second magnet ring are located at different angular positions than ends of each magnet within the first magnet ring relative to the shaft axis of the shaft. The magnet angle $\delta$ is preferably an optimal magnet angle for minimizing cogging torque and line to line back emf harmonics. A method of determining the optimal magnet angle includes determining a first magnet angle where cogging torque is minimized, determining a second magnet angle where harmonic content of $n^{th}$ harmonic is minimized, and using the first magnet angle and the second magnet angle, determining an optimal magnet angle for minimizing both cogging torque and nth harmonic.

12 Claims, 5 Drawing Sheets

PERMANENT MAGNET ELECTRIC MOTOR AND METHOD OF MAKING SAME

TECHNICAL FIELD

This invention relates to a method and an apparatus for torque ripple reduction in electric motors.

BACKGROUND OF THE INVENTION

Most motor vehicle steering systems produced today employ some type of power assist steering system to assist the driver in steering the front wheels. In general, power assist steering systems employ a hydraulic pump to provide pressurized fluid to a piston connected to or formed in the steering rack assembly, the pressure being regulated by a valve which is opened or closed by an amount that varies with the torque in the steering column. Thus, as the driver exerts more effort against the steering wheel, the valve is opened to provide more fluid to the piston, thereby assisting the driver in steering the vehicle.

It has been heretofore known to provide a power assist system using an electric motor as the source of motive force as opposed to pressurized hydraulic fluid. This would improve fuel economy and reduce the manufacturing cost of the vehicle. Furthermore, it is suggested that reliability of the system would be improved since many components including the hydraulic pump and fluid lines can be eliminated. However, prior attempts at making an electric power assist steering system have proved unsatisfactory.

Perhaps the most vexing issue with electric power assist steering systems has been torque ripple felt at the hand wheel. Torque ripple is the variation in reaction torque felt by the driver as the hand wheel is turned. Because drivers are so used to the smooth response of the hydraulic power assist steering systems, they have generally reacted unfavorably to electric power assist steering systems due to the presence of torque ripple.

Most torque ripple is caused by the electric motor that provides the power assist motive force. There are two primary sources of torque ripple in the electric motor. The first is known as cogging torque, which is caused by the magnetic attraction between the rotor mounted permanent magnets to the stator. It has been known to skew the rotor magnets and to use more expensive surface-parallel type magnets to reduce the effect of cogging torque, however, the magnetization process and machining process for skewed and for surface parallel magnets is higher, thereby reducing the benefits of the electric power assist steering system. The other primary source of torque ripple is the harmonics content in the line-to-line back-emf due to an imperfect sinusoidal back-emf waveform.

BRIEF SUMMARY OF THE INVENTION

The above discussed and other drawbacks and deficiencies are overcome or alleviated by a method of selecting a magnet angle for a permanent magnet electric motor including determining a first magnet angle where cogging torque is minimized, determining a second magnet angle where harmonic content of $n^{th}$ harmonic is minimized, and using the first magnet angle and the second magnet angle, determining an optimal magnet angle for minimizing both cogging torque and nth harmonic.

In another embodiment, a method of reducing torque ripple in an electric motor includes providing a first magnet ring on a rotor positioned about a shaft of a motor, the first magnet ring having magnets each occupying a magnet angle $\delta$ on the rotor, providing a second magnet ring on the rotor, the second magnet ring having magnets each occupying a magnet angle $\delta$ on the rotor, and shifting the second magnet ring a non-zero number of degrees relative to the first magnet ring wherein ends of each magnet within the second magnet ring are located at different angular positions than ends of each magnet within the first magnet ring relative to a shaft axis of the shaft.

In another embodiment, a motor for reducing torque ripple includes a shaft having a shaft axis, a rotor positioned about the shaft, a first magnet ring positioned on the rotor, the first magnet ring comprising magnets each occupying a magnet angle $\delta$ on the rotor, and a second magnet ring positioned on the rotor, the second magnet ring comprising magnets each occupying a magnet angle $\delta$ on the rotor, wherein the second magnet ring is shifted a non-zero number of degrees relative to the first magnet ring wherein ends of each magnet within the second magnet ring are located at different angular positions than ends of each magnet within the first magnet ring relative to the shaft axis of the shaft.

In another embodiment, a motor for reducing torque ripple includes a shaft having a shaft axis, a rotor positioned about the shaft, and a plurality of magnets positioned about the rotor, each magnet occupying a magnet angle $\delta$ on the rotor, wherein the magnet angle $\delta$ is an optimal magnet angle for minimizing cogging torque and line to line back emf harmonics.

The above discussed and other features and advantages of the present invention will be appreciated and understood by those skilled in the art from the following detailed description and drawings.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

The problem of torque ripple caused by the harmonics content in the line-to-line back-emf due to an imperfect sinusoidal back-emf waveform is identified and discussed in more detail in the commonly-assigned U.S. Pat. No. 6,380,658 issued on Apr. 30, 2002 and incorporated herein by reference in its entirety.

In one embodiment of eliminating the cogging torque source of torque ripple without using the expensive process of skewing, the below described embodiment uses a low-cost magnet structure, such as bread-loaf type magnets. Elimination of skewing and use of bread-loaf type magnets reduces the magnet manufacturing cost, which in turn lowers the motor manufacturing cost. Thus, this embodiment provides a cost-effective, high-performance actuator for electric power steering applications.

Figure 1:
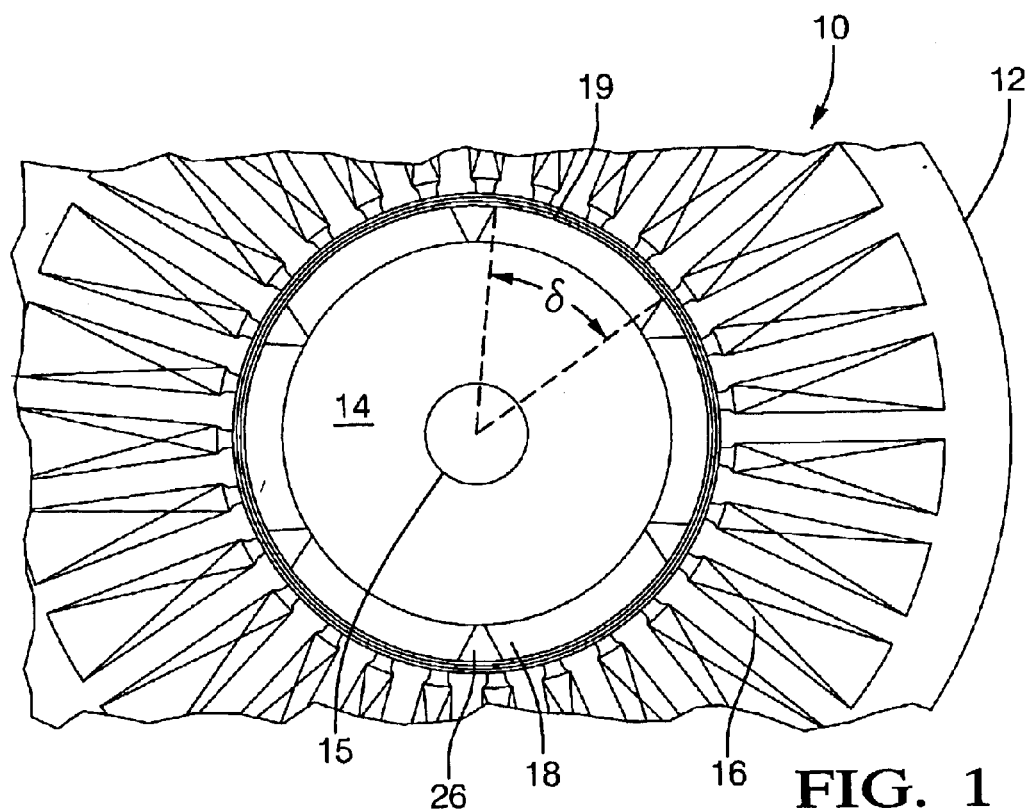
FIG. 1 shows a portion of a cross-section of a permanent magnet electric motor having surface parallel magnets.

A brushless permanent magnet electric motor 10 having surface parallel magnets 18 is shown in FIG. 1. Motor 10 includes a stator 12 having disposed therein a rotor 14 mounted to shaft 15. Stator 12 includes a plurality of slots 16 having windings formed therein for generating a magnetic field which interacts with the magnetic fields produced by surface parallel magnets 18. In the exemplary embodiment, stator 12 has twenty-seven slots 16 and rotor 14 has six magnets 18; thus, the slot/pole ratio is 4.5. Magnets 18 may be separated by air spaces 26 equidistantly spaced between the magnets 18. Windings disposed in slots 16 may be provided in a traditional manner as generally known, or fractional pitch windings may be used in conjunction with this invention. For example, the fractional-pitch winding scheme described in commonly-assigned U.S. patent application Ser. No. 09/850,758, which was filed on May 8, 2001 by Buyun Liu et al. and published on Nov. 14, 2002 as Publication No. US2002/0167242 A1, and which is hereby incorporated herein by reference in its entirety, or one similar thereto may be employed.

Figure 2:
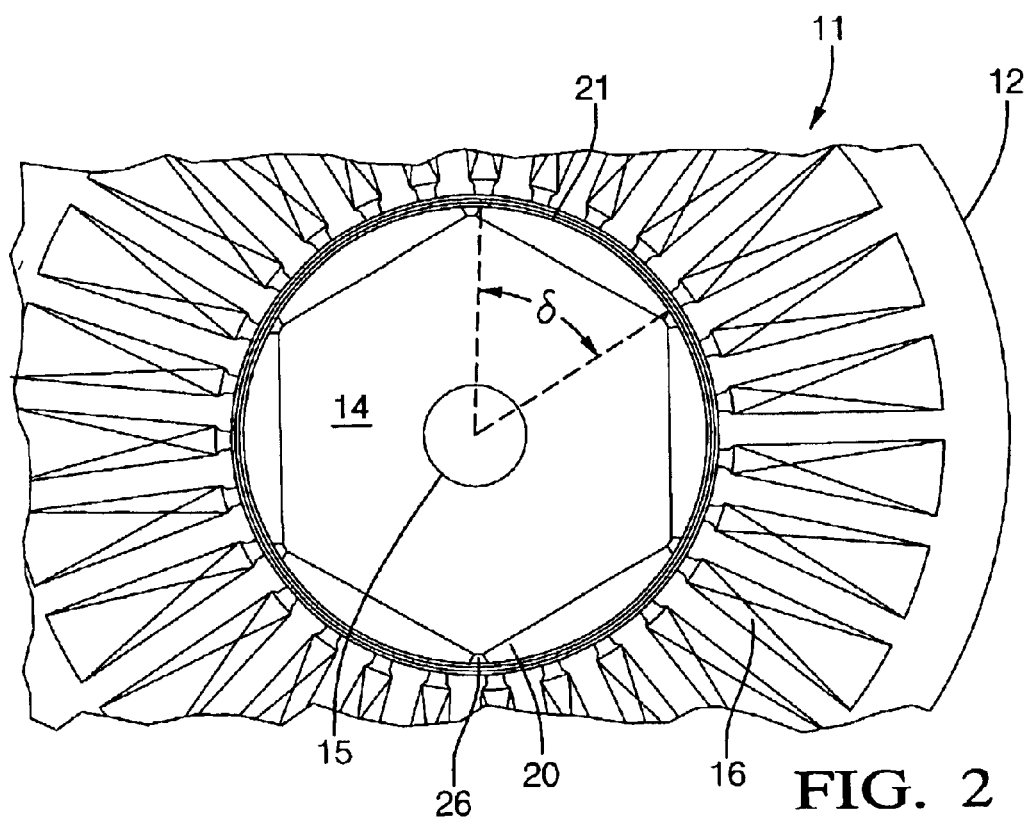
FIG. 2 shows a portion of a cross-section of a permanent magnet electric motor having breadloaf magnets.

In another embodiment, a permanent magnet electric motor 11 has breadloaf magnets 20 as shown in FIG. 2, but is otherwise similar to the motor shown in FIG. 1. Each surface-parallel magnet 18 and breadloaf magnet 20 includes an outer face, 19 and 21 respectively, thereof which delimits an angle δ at the axis of shaft 16. Angle δ will be referred herein as the magnet angle where the angle δ corresponds to the amount of surface area of the rotor 14 that comprises a magnet. In other words, angle δ is the width of a magnet in electric angle in relation to a motor shape.

Figure 3:
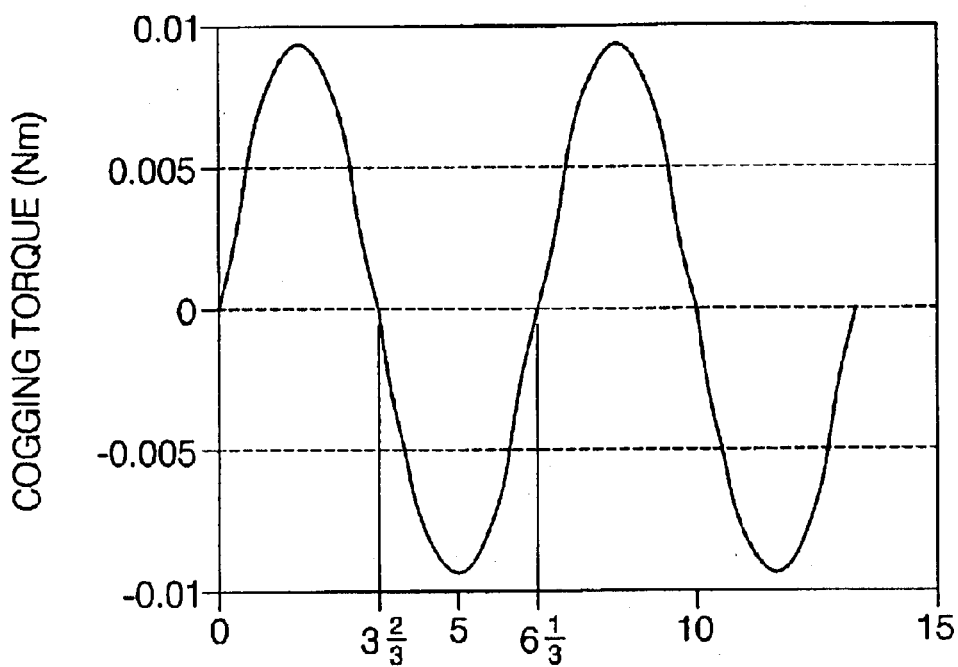
FIG. 3 shows an exemplary plot of cogging torque.

As the rotor rotates within motor 10, magnets 18, 20 interact with stator 12 due to the mutual attraction and generate what are commonly referred to as cogging torques. FIG. 3 shows a plot of cogging torque with respect to the rotor position in mechanical degrees (mDeg.) for the motor of FIG. 2 with magnets 20 not having any skew. This plot was generated using finite element analysis. Assuming that positive cogging torque is applied in a clockwise direction and the angles are measured counter-clockwise, or vice versa, it can be seen, as the rotor is rotated from 0 mDeg. to 3⅓ mDeg., the cogging torque is directed against the direction of rotation. As rotor continues from 3⅓ mDeg. to 6⅔ mDeg., the cogging torque is directed in the direction of rotation. Thus, an equilibrium is reached every 6⅔ degrees. In other words, the cogging frequency is 54 cycles per mechanical revolution (CPMR), which in this case happens to be twice the number of slots in stator 12 (twenty-seven).

Figure 4:
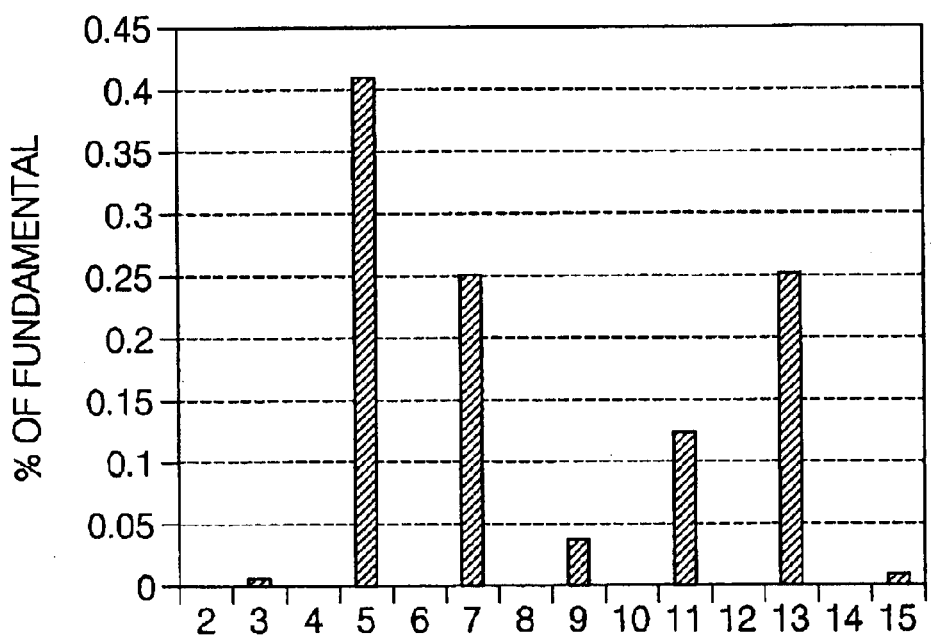
FIG. 4 shows an exemplary chart showing harmonic content of back-emf.

FIG. 4 shows a graph describing the amplitude of the harmonics as a percentage of the fundamental frequency component present in the line-to-line back-emf. The fundamental frequency $f$ for a sinusoidal motor is given by $f=NP/120$ Hz, where N is the motor speed in rpm and P is the number of rotor poles. Reference is again made to the commonly-assigned U.S. Pat. No. 6,380,658 issued on Apr. 30, 2002, which is incorporated herein by reference, for detailed explanation as to the development of this data. Essentially, it is the result of Fourier analysis on the line-to-line back-emf. In this example, the $5^{th}$ harmonic content is about 0.4% of the fundamental component. This may not be acceptable for applications such as electric power steering. As previously described, skewing may help lower the harmonic content in the line to line back-emf, but is a costly alternative.

The amplitude of the cogging torque (FIG. 3) is about 19 mN·m, peak-to-peak (along the vertical axis of the graph). If magnets 20 were skewed in the known manner, cogging torque could be significantly reduced, but skewed magnets have complex geometries and are expensive to manufacture. However, extensive finite element analysis shows that the main sources of torque ripple, including cogging torque and harmonics in the line-to-line back-emf, can be controlled by varying the magnet angular width (the angle that the outer surface of the magnet produces at the center).

Figure 5:
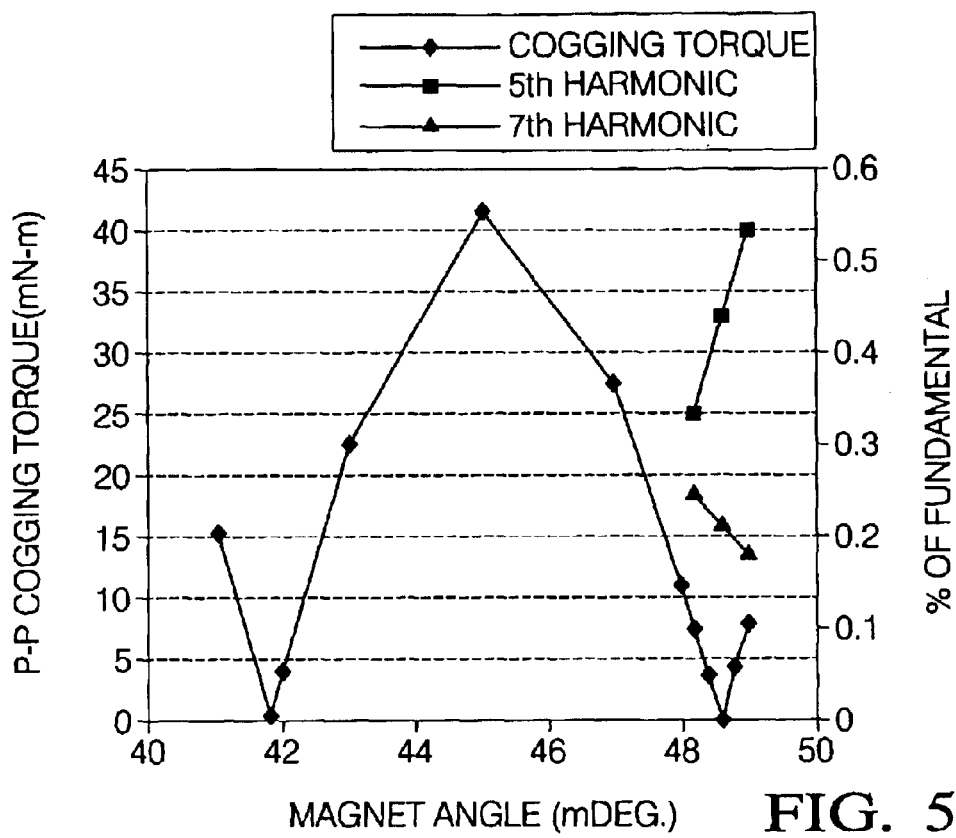
FIG. 5 shows a plot of cogging torque and back-emf harmonics varying with respect to the magnet angle for the motor of FIG. 1.
Figure 6:
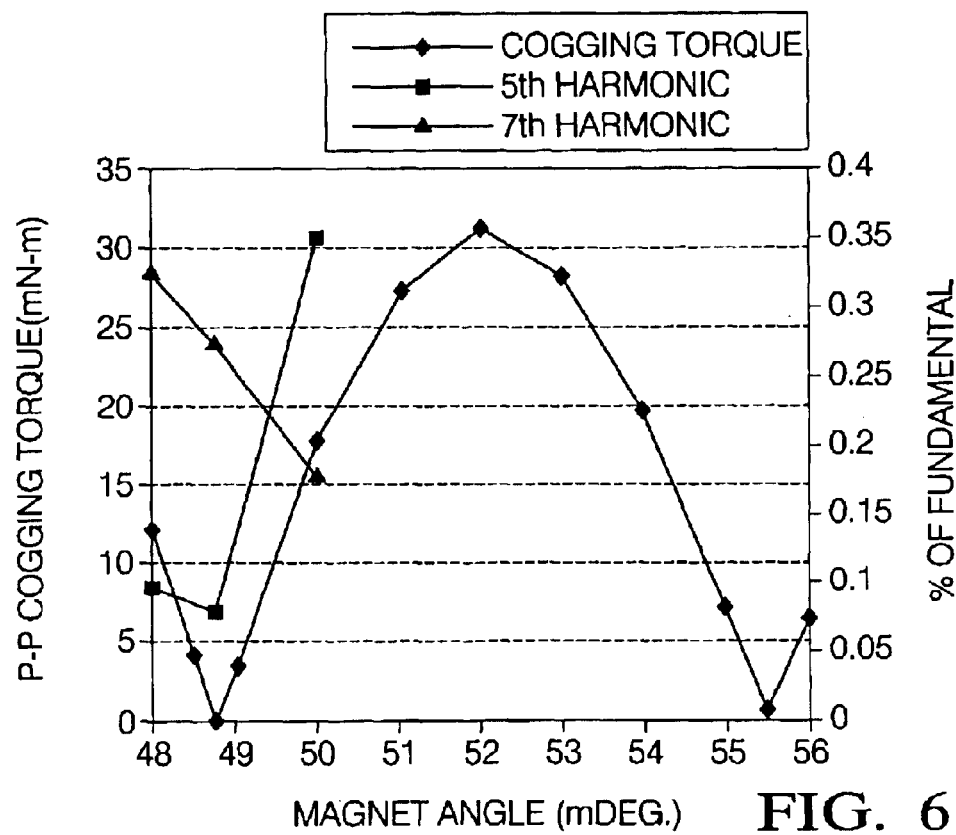
FIG. 6 shows a plot of cogging torque and back-emf harmonics varying with respect to the magnet angle for the motor of FIG. 2.

FIGS. 5 and 6 show the dependency of the peak-to-peak cogging torque and harmonic contents on the magnet angle for surface parallel and breadloaf type rotor magnets, respectively. As clearly represented in the plots, the peak-to-peak cogging torque reduces to zero at about 42 mDeg. and 48.5 mDeg. for the surface parallel magnet and at about 49 and 55.5 mDeg. for breadloaf magnets. From these figures, it can be seen that proper design of the magnet angle may reduce the cogging torque.

Once the magnet angles correlating to the minimum values of cogging torque are known, it is possible to select magnet angles to minimize the back-emf harmonics as well. For example, as shown by the afore-mentioned commonly-assigned U.S. Pat. No. 6,380,658, the fifth harmonic component of line-line back emf can be reduced to zero where sin (δn/2)=0°, 180°, 360°, 540°, etc., in electrical angle, where n=the harmonic component being reduced to zero. Thus, δ=2(360°)/5=144 eDeg., which correlates to 48° in the 6-pole electric motor of the example shown in FIG. 2 (144°/number of pole pairs). Thus, the fifth harmonic can be reduced to zero with a magnet angle of 48 mDeg., which is very close to a magnet angle of 48.5° where cogging torque is minimized, as shown in FIG. 5. Thus, in order to cancel the $5^{th}$ harmonic, the theoretical value of δ=48°. FIG. 5 shows one minimum of cogging torque close to the magnet angle, which is good for minimum $5^{th}$ harmonics also.

Since the $5^{th}$ and $7^{th}$ harmonics are the most undesirable terms, the minimization of the $5^{th}$ and $7^{th}$ harmonic terms will make resultant waveform closer to sine wave. By plotting the $5^{th}$ and $7^{th}$ harmonics contents around the magnet angle corresponding to a minimum cogging torque, an optimum magnet angle minimizing the effects of both cogging torque and harmonics can be determined. It should be noted that meeting the magnet angle for minimizing cogging torque is much more difficult than meeting an angle which minimizes the harmonics. That is, as is clear from a review of FIGS. 5 and 6, any deviation, plus or minus, from the magnet angle which minimizes cogging torque results in sharp increases in cogging torque. Thus, when selecting an optimum magnet angle, choosing a magnet angle as close as possible to the magnet angle which minimizes cogging torque is important. To take the $5^{th}$ and $7^{th}$ harmonics into consideration, the optimum magnet angle for minimizing the cogging torque could be weighted more significantly than the optimum magnet angles which minimize the $5^{th}$ and $7^{th}$ harmonics. For example, if an optimal magnet angle is to be derived to satisfy the minimization of cogging torque and $5^{th}$ harmonics, then the cogging torque could be weighted 0.95 and the $5^{th}$ harmonics could be weighted 0.05, where the weighting factors add up to one. By example only, if the magnet angle for minimizing cogging torque is 48.6 and the magnet angle for minimizing the $5^{th}$ harmonics is 48.5, then using exemplary weighting factors, the optimal magnet angle would be 48.595.

Optimal magnet angle=(weighting factor$_1$)angle$_1$+(weighting factor$_2$)angle$_2$ Where weighting factor$_1$+weighting factor$_2$=1

Similarly, if the $7^{th}$ harmonic minimization is to be taken into consideration, Optimal magnet angle=(weighting factor$_1$)angle$_1$+(weighting factor$_2$)angle$_2$+(weighting factor$_3$)angle$_3$ Where weighting factor$_1$+weighting factor$_2$+weighting factor$_3$ For both the surface-parallel and bread loaf type magnets shown in FIGS. 1 and 2, the optimum magnet angle was found to be about 48.5°. The plots in FIGS. 5 and 6 show how accurate the magnet angle should be in order to minimize the peak-to-peak cogging torque. In the previous analysis, the number of cogging cycles per mechanical revolution (CPMR) came out to be 54 assuming the magnets are identical and located ideally. Research shows that the manufacturing variations have significant influence on the amplitude and frequency of the cogging torque.

Slight variation in the magnet geometry or dislocation of the magnets results in higher amplitude and lower CPMR of the cogging torque. If the error is sufficiently great, the CPMR of the cogging torque may be equal to the number of slots, i.e., for the exemplary 27 slot motor shown in FIGS. 1 and 2, the cogging torque will be 27 cycles per mechanical revolution (CPMR).

Figure 7:
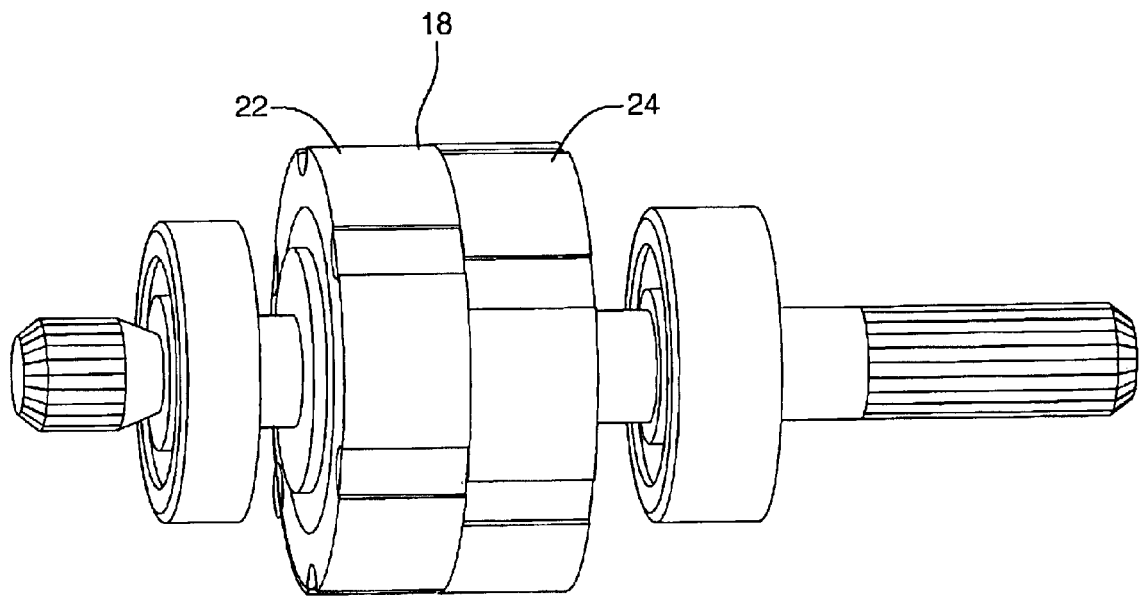
FIG. 7 shows a side view of the magnets of FIG. 1 split in two pieces.
Figure 8:
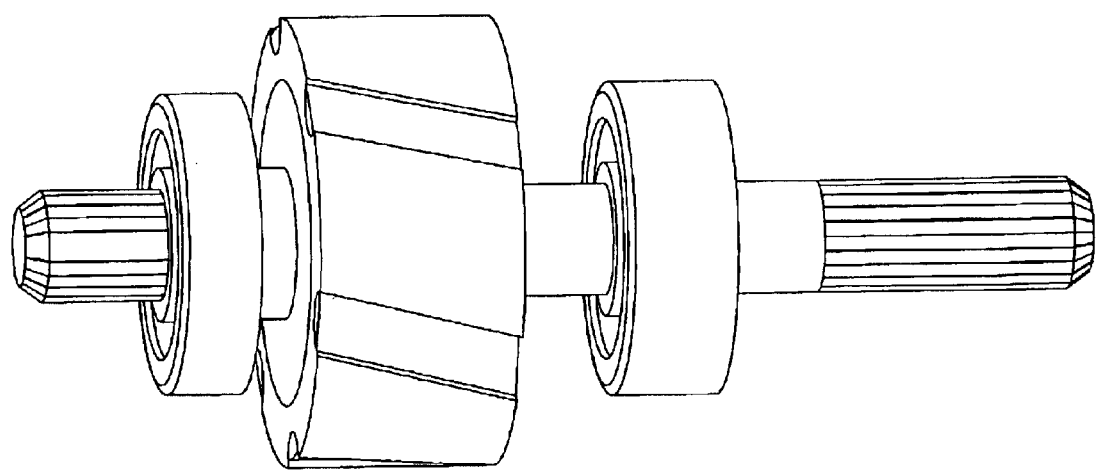
FIG. 8 shows a side view of skewed magnets.

Under these circumstances, the cogging torque cannot be minimized by setting the magnet angle as described above, which only minimizes the 54 CPMR component of cogging torque. To eliminate the 27 CPMR component of cogging torque which occurs due to manufacturing variations, the magnets 18, 20 are segmented into two pieces 22, 24 as shown in FIG. 7. Each piece 22, 24 is half the stack length long, that is, each piece 22, 24 has the same axial length. The piece 22, 24 are relatively shifted by 6⅔ degrees in space. The rotor 14 can thus be viewed as having two sets of magnets 18, 20 where each set consists of six poles and one set is 6⅔ mechanical degrees shifted in space from the other set. The axial length of the combined pieces 22, 24 should be equivalent to an axial length of a rotor which is not divided into two pieces, as shown in FIG. 8. The 27 CPMR component of cogging torque should cancel out.

The motor designed according to the above-mentioned method is useful where smooth power without any discernable torque ripple is desired.

Figure 9:
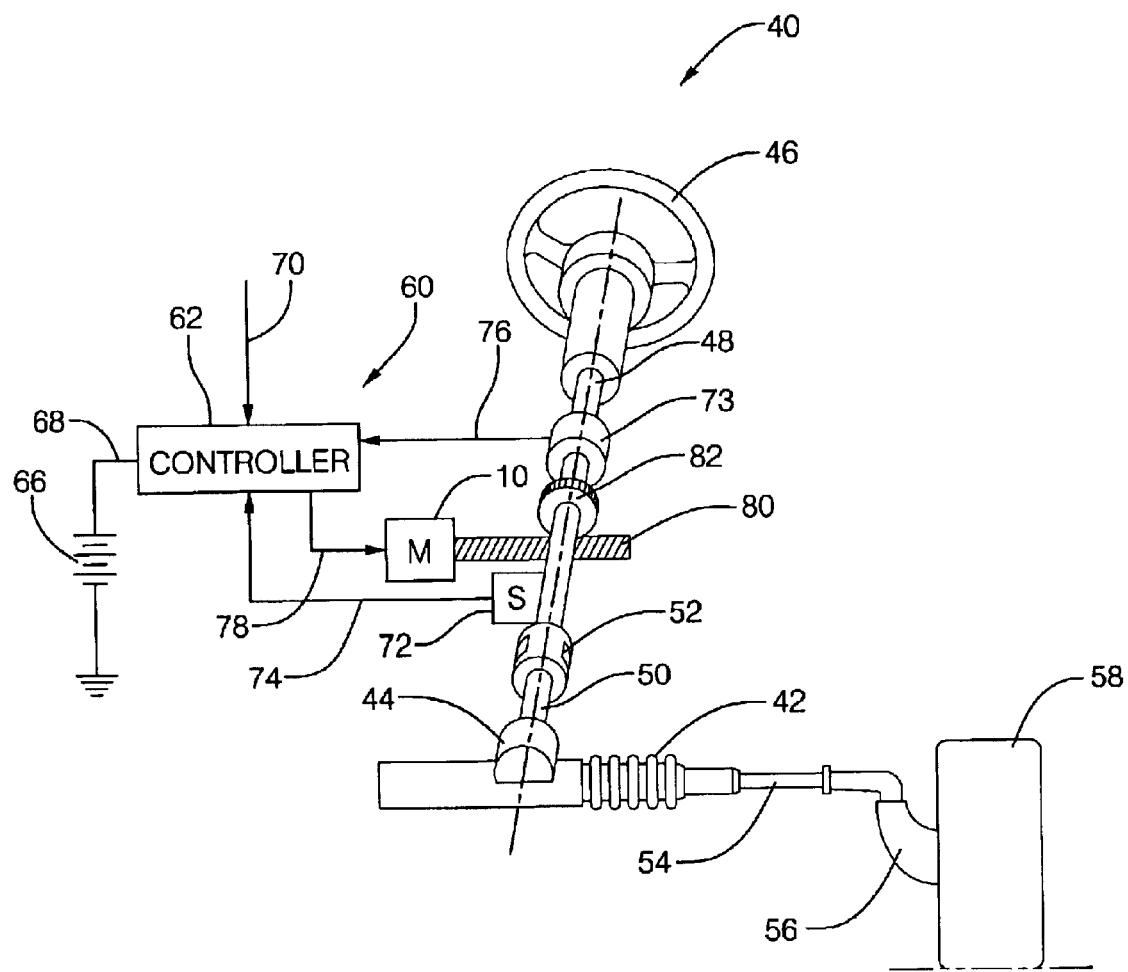
FIG. 9 shows an exemplary electric power assist steering system using the motor of FIG. 1 or 2.

One such application is in an electrical power steering system. Referring now to FIG. 9, reference numeral 40 generally designates a motor vehicle power steering system employing motor 10. The steering mechanism 42 is a rack-and-pinion type system and includes a toothed rack (not shown) and a pinion gear (also not shown) located under gear housing 44. As the hand wheel 46 is turned, the upper steering shaft 48, connected to the lower steering shaft 50 through universal joint 52, turns the pinion gear. Rotation of the pinion gear moves the toothed rack, which moves tie rods 54 (only one shown), that in turn move the steering knuckles 56 (only one shown), which turn wheels 58 (only one shown).

Electric power steering assist is provided through the unit generally designated by reference numeral 60 and includes a controller 62 and the electric motor 10. The controller 62 is powered by a vehicle power supply 66 through line 68.

The controller 62 receives a signal representative of the vehicle velocity on line 70. Steering pinion gear angle is measured through position sensor 72, which may be an optical encoding type sensor, variable resistance type sensor or any other suitable type of position sensor, and fed to the controller 62 through line 74.

As the steering wheel 46 is turned, torque sensor 73 senses the torque applied to the hand wheel 46 by the vehicle operator. The torque sensor 73 may include a torsion bar (not shown) and a variable resistive-type sensor (also not shown) which outputs a variable resistance signal to controller 62 through line 76 in relation to the amount of twist on the torsion bar. Although this is the preferable torque sensor, any other suitable torque-sensing device used with known signal processing techniques are contemplated.

In response to the inputs on lines 70, 74, and 76, the controller 62 sends a current command or a voltage command through line 78 to the electric motor 10. The motor 10 in turn supplies torque assist to the steering system through a worm 80 and a worm gear 82, in such a way as to providing a torque assist to the vehicle steering in addition to a driving force exerted by the vehicle operator.

Note that any torque ripple generated by motor 10 would be felt at hand wheel 46. In this environment, motor 10 designed and manufactured according to the above method, will preferably generate torque ripple below perceptible levels.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Terms used herein such as first, second, etc. are not intended to imply an order in space or importance, but are merely intended to distinguish between two like elements.

What is claimed is:

1. A method of selecting a magnet angle for a permanent magnet electric motor comprising:
    determining a first magnet angle where cogging torque is minimized;
    determining a second magnet angle where harmonic content of $n^{th}$ harmonic is minimized; and,
    using the first magnet angle and the second magnet angle, determining an optimal magnet angle for minimizing both cogging torque and nth harmonic.

2. The method of claim 1 wherein the nth harmonic is the $5^{th}$ harmonic.

3. The method of claim 1 wherein the first magnet angle is multiplied by a first weighting factor to arrive at a first weighted magnet angle and the second magnet angle is multiplied by a second weighting factor to arrive at a second weighted magnet angle, and wherein the first weighted magnet angle and the second weighted magnet angle are added to acquire the optimal magnet angle.

4. The method of claim 3 wherein a sum of the first weighting factor and the second weighting factor equals one.

5. The method of claim 3 wherein the first weighting factor is larger than the second weighting factor.

6. The method of claim 1 further comprising determining a third magnet angle where harmonic content of mth harmonic is minimized, and using the first, second, and third magnet angles for determining an optimal magnet angle for minimizing cogging torque and nth and mth harmonics.

7. The method of claim 6 wherein the nth harmonic is the $5^{th}$ harmonic and the mth harmonic is the $7^{th}$ harmonic.

8. The method of claim 6 wherein the first magnet angle is multiplied by a first weighting factor to arrive at a first weighted magnet angle, the second magnet angle is multiplied by a second weighting factor to arrive at a second weighted magnet angle, and the third magnet angle is multiplied by a third weighting factor to arrive at a third weighted magnet angle, and the first weighted magnet angle, the second weighted magnet angle, and the third weighted magnet angle are added to acquire the optimal magnet angle.

9. The method of claim 8 wherein a sum of the first weighting factor, second weighting factor, and third weighting factor equals one.

10. The method of claim 8 wherein the first weighting factor is larger than the second weighting factor and larger than the third weighting factor.

11. A method of reducing torque ripple in an electric motor, the method comprising:

providing a first magnet ring on a rotor positioned about a shaft of a motor, the first magnet ring comprising magnets each occupying a magnet angle $\delta$ on the rotor;

providing a second magnet ring on the rotor, the second magnet ring comprising magnets each occupying a magnet angle $\delta$ on the rotor; and, shifting the second magnet ring a non-zero number of degrees relative to the first magnet ring wherein ends of each magnet within the second magnet ring are located at different angular positions than ends of each magnet within the first magnet ring relative to a shaft axis of the shaft.

12. The method of claim 11 wherein the non-zero number of degrees is $6\frac{2}{3}$ degrees.

* * * * *